United States Patent

Haas et al.

[11] Patent Number: 5,874,981
[45] Date of Patent: Feb. 23, 1999

[54] COMBINED PULSE-WIDTH AND AMPLITUDE MODULATION OF EXPOSING LASER BEAM FOR THERMAL DYE TRANSFER

[75] Inventors: Daniel D. Haas, Webster; Sanwal P. Sarraf, Pittsford, both of N.Y.

[73] Assignee: Eastman Kodak Company, Rochester, N.Y.

[21] Appl. No.: 574,506

[22] Filed: Dec. 19, 1995

Related U.S. Application Data

[60] Provisional application No. 60/004,000 Sep. 19, 1995.

[51] Int. Cl.⁶ .................................................. H04N 1/21
[52] U.S. Cl. ........................... 347/187; 347/252; 347/251; 358/298
[58] Field of Search ................................. 347/251, 252, 347/253, 247, 185, 187, 192, 193; 358/298, 300

[56] References Cited

U.S. PATENT DOCUMENTS

| | | | |
|---|---|---|---|
| 4,679,057 | 7/1987 | Hamada | 346/76 L |
| 4,804,975 | 2/1989 | Yip | 347/237 |
| 4,827,279 | 5/1989 | Lubinsky et al. | 346/1.1 |
| 4,903,042 | 2/1990 | Kaufl et al. | 347/251 |
| 5,021,805 | 6/1991 | Imaizumi et al. | 347/187 |
| 5,126,760 | 6/1992 | DeBoer | 347/251 |
| 5,144,631 | 9/1992 | Okino | 372/25 |
| 5,168,288 | 12/1992 | Baek et al. | 347/240 |
| 5,241,328 | 8/1993 | Sarraf et al. | 346/76 L |
| 5,270,736 | 12/1993 | Inoue et al. | 346/108 |
| 5,325,383 | 6/1994 | Davis et al. | 372/26 |
| 5,371,524 | 12/1994 | Herczeg et al. | 346/107 R |
| 5,389,959 | 2/1995 | Haas | 347/187 |
| 5,517,231 | 5/1996 | Sarraf | 347/252 |
| 5,521,629 | 5/1996 | Deboer et al. | 347/193 |
| 5,529,408 | 6/1996 | Moriguchi et al. | 347/187 |
| 5,553,951 | 9/1996 | Simpson et al. | 347/187 |
| 5,557,303 | 9/1996 | Agano et al. | 347/187 |
| 5,671,003 | 9/1997 | Herczeg et al. | 347/251 |

*Primary Examiner*—Peter S. Wong
*Assistant Examiner*—K. Shin
*Attorney, Agent, or Firm*—Nelson Adrian Blish; David A. Novais

[57] ABSTRACT

A laser thermal system that uses a dye donor produces a desired relationship of exposure to density by modifying the input current waveform supplied to the exposure source. The modification is a combination of amplitude modulation and pulse width modulation in an imagewise fashion. The efficiency and the speed of image formation is increased by bringing the dye donor temperature near the threshold of dye transfer using a segment of the total current waveform for a very short duration.

8 Claims, 9 Drawing Sheets

COMBINED PULSE-WIDTH AND AMPLITUDE MODULATION OF EXPOSING LASER BEAM FOR THERMAL DYE TRANSFER

BACKGROUND OF THE INVENTION

1. Technical Field

This invention relates generally to laser digital thermal dye transfer printers, and more specifically to such printers using combined pulse-width and amplitude modulation of exposure source power.

2. Background Art

Any type of light source such as incandescent bulbs, arc lamps, flash lamps, and light-emitting diodes might be used to supply the writing beam for thermal dye transfer. Each writing beam in laser thermal dye transfer must deposit at least a threshold amount of exposure, denoted by $H_{threshold}$, at a location (x,y) on a donor in order to remove a noticeable amount of image dye from that location, possibly transferring a portion of the removed dye to an adjacent receiver. Since $H_{threshold}$ typically decreases with increasing beam irradiance, decreasing beam width, and increasing scanning velocity, laser beams are the most commonly used light sources.

The specific value of $H_{threshold}$ may be dependent upon the chemical identities of the donor's constituents, their amounts, and their relative placement within the donor; and upon the strength, spectral content, spatial distribution, and temporal duration of the exposing beam. In the case of a scanned exposure, the local scanning speed and the local scan line spacing of each exposing beam also affects $H_{threshold}$.

The amount of dye transferred from a location (x,y) on the donor is approximately linearly proportional to the exposure effected at that location on one pass of a scanning writing beam if the laser thermal dye transfer is performed "near the adiabatic limit". Laser thermal dye transfer is said to be performed "near the adiabatic limit" if time $T_{traverse}$ required by the scanning beam to traverse a distance on the donor equal to the beam's width at that location on the donor is significantly less than the time required for the heat generated by that beam's absorption in the donor to diffuse a distance equal to the smallest dimension of the donor volume being heated at one instant by the beam. The exposure H deposited by the beam during the time $T_{traverse}$ is the beam's irradiance accumulated during this traversal time $T_{traverse}$. The beam's irradiance at a location (x,y) is the product of the beam's power P[t], which may be modulated or extinguished during the traversal time, and the spatial distribution pattern $\Gamma[x_{beam}, y_{beam}]$ of that light power in the reference frame of the scanned beam at location (x,y) in the donor so that the exposure can be expressed as:

$$H[x,y] = \int_{T_{traverse}} P[t]\Gamma[x_{beam}, y_{beam}] dt \quad (1)$$

In digital laser thermal dye transfer printers, the average density of an image pixel may be varied by changing the power of the exposure source (referred to as "amplitude modulation"). Alternatively, the average density of an image pixel produced by digital laser thermal dye transfer printers may be varied by changing the time during which the exposure source is ON (referred to as "pulse width modulation") while maintaining the source at a fixed optimum power, such as disclosed in commonly assigned U.S. Pat. No. 5,241,328, which issued to S. Sarraf et al. on Aug. 31, 1993. As used herein, phrases such as "exposure source" "exposure beam source" or the like are intended to refer to a radiation source 7 that can be modulated internally of the the radiation generator, such as for example by controlling the electrical power to a laser as shown in FIG. 1A, or to a radiation source 7' that can be modulated externally of a radiation generator 17 having a constant power supply 21, such as for example by controlling the input to an acousto-optic modulator 19 through which a laser beam is transmitted as shown in FIG. 1B.

While the pulse width modulation system disclosed in the Sarraf et al. patent provides a linear change in image density (tone scale) with changes in arbitrary exposure, this is not always the most desired result. In some applications, a non-linear relationship between exposure and density is desired for detailed representation of certain aspects of image content.

DISCLOSURE OF THE INVENTION

Accordingly, it is an object of the present invention to provide a system that can produce a desired relationship of exposure to density by modifying the input current waveform supplied to the exposure source. The modification is a combination of amplitude modulation and pulse width modulation in an imagewise fashion.

A feature of the present invention improves the efficiency and the speed of image formation by bringing the donor temperature near the threshold of dye transfer using a segment of the total current waveform for a very short duration.

According to another feature of the present invention digital thermal dye transfer printing is expedited by modulating the exposure source using a combined pulse width modulation and amplitude modulation scheme, resulting in improved control and more efficient encoding of the tone scale of the printed image.

According to still another feature of the present invention, a digital thermal dye transfer printer includes a radiation beam source, means to scan a finely focused spot of light from the laser source along a line, and laser drive and control logic for turning the laser source ON to predetermined power levels for a time specified by image data.

When performing laser thermal dye transfer near the adiabatic limit, the present invention controls the amount of dye removed from the donor and possibly transferred to a receiver to produce an image or dye pattern by writing with an exposure beam power whose temporal profile and duration effects an accumulated exposure of the donor (in excess of $H_{threshold}$ for these writing conditions) corresponding to the desired amount of image dye removed or transferred. The temporal profile of the exposure beam power could be specified to take on a complicated series of values during one traversal time as directed by a "Power Profile Look-Up Table" 25 as shown in FIGS. 1A, 1B. Another look-up table, called the "Duration Look-Up Table" 27, could specify a complicated sequence of times that the laser is activated and extinguished during one traversal time in order to provide more possible exposure levels than would be attainable with only power-profile control or only duration control in order to achieve the requisite exposure to produce the desired image density at each location on the donor or receiver. In the preferred embodiment, the exposure beam power profile is specified to be a simple function of time, while the duration control involves only one activation and one extinction during each traversal time to permit inexpensive implementation using digital or analog electrical circuits and to minimize the required high-frequency response of the exposure beam source and its energy-supply circuits.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
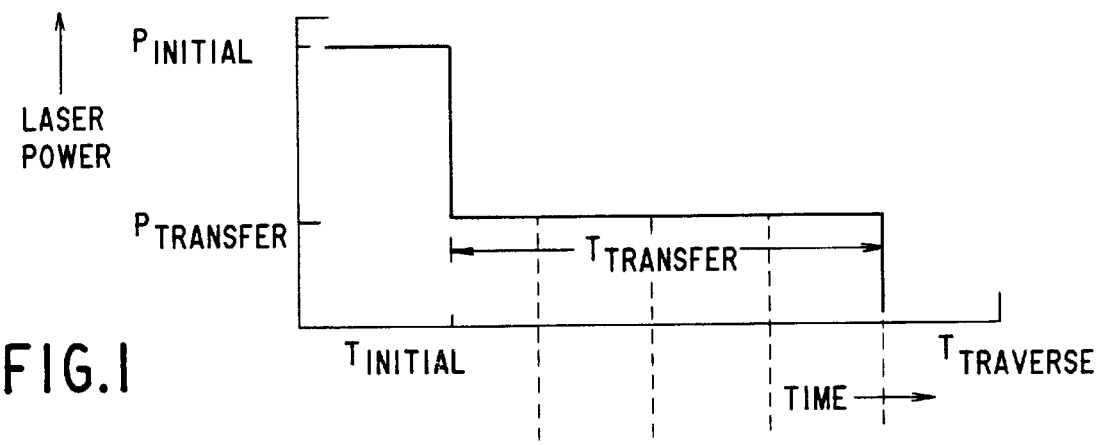
FIG. 1 is a graph showing laser power versus beam-on time according to the present invention.
Figure 1A:
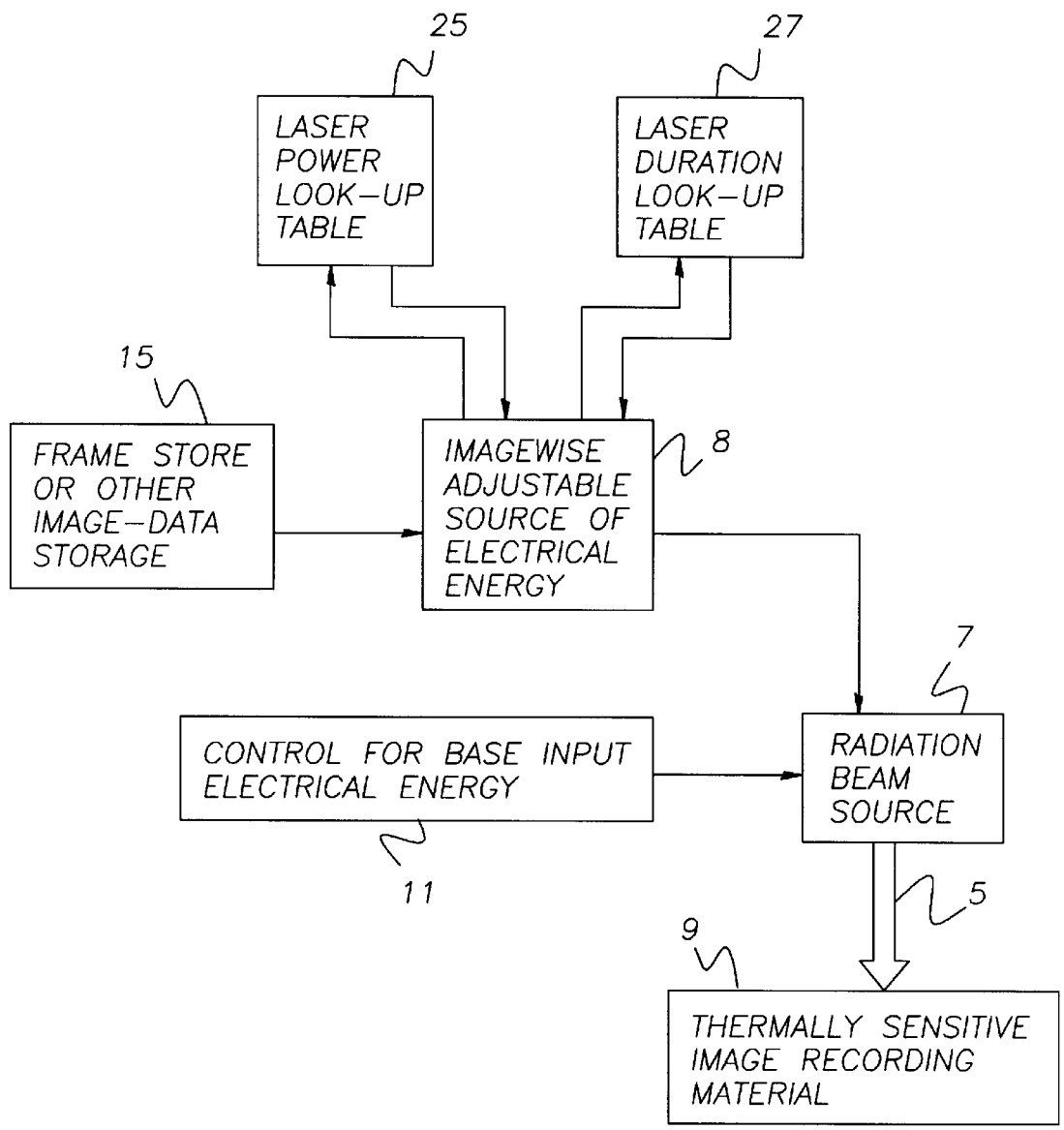
FIGS. 1A and 1B schematically illustrate an example of the system of the present invention.
Figure 1B:
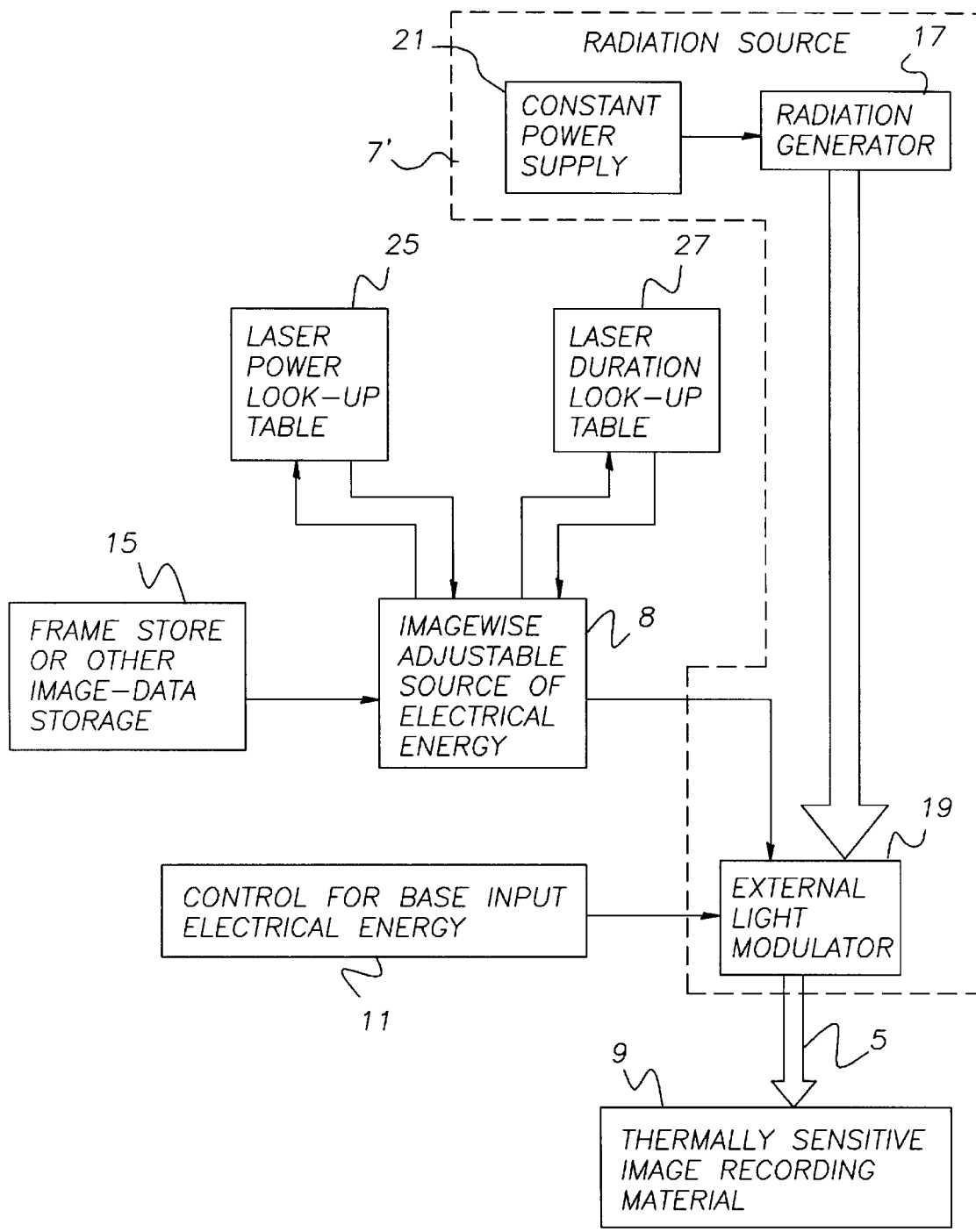

In a first embodiment depicted in FIG. 1, the laser power 5 provided by a known light source 7 as schematically shown in FIG. 1A is driven at constant value $P_{initial}$ for at least the time $T_{initial}$, to deposit $H_{threshold}$ on the donor 9 at the beginning of each beam width traversal. An imagewise adjustable source of input electrical energy 8 adjust energy to light source 7. Then the laser power, controlled by a control means 11 and imagewise source 8 which receives data from a frame store or image data source 15, is driven at constant value $P_{transfer}$ for a time $T_{transfer}$ equal to or less than the time remaining for this traversal which deposits exposure sufficient to remove or transfer the desired amount of dye.

In order to allow the largest range of $T_{transfer}$ to provide the greatest number of levels of exposure, $T_{initial}$ is made as short as possible by choosing $P_{initial}$ to be nearly the maximum permissible power without damaging the laser. $P_{transfer}$ is preferably chosen to be just adequate to remove (or transfer) enough dye in order to produce the minimum (or maximum) image density required by the intended application so that the finest gradation in density is available.

Figure 2:
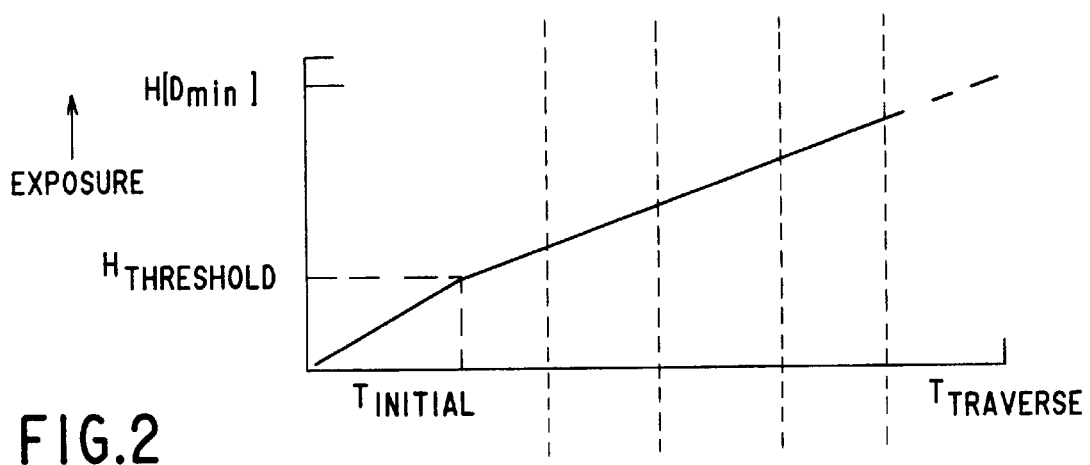
FIG. 2 is a graph showing laser exposure versus beam-on time according to the present invention.

The temporal profile of the power:

$$P[t] = \begin{cases} P_{initial} & \text{for } 0 \leq t \leq T_{initial} \\ P_{transfer} & \text{for } T_{initial} < t \leq (T_{initial} + T_{transfer}) \end{cases} \qquad (2)$$

deposits exposure:

$$H[x,y] = \begin{cases} P_{initial}t & \text{for } 0 \leq t \leq T_{initial} \\ H_{threshold} + P_{transfer}(t - T_{initial}) & \text{for } T_{initial} \leq t \leq (T_{initial} + T_{transfer}) \end{cases} \qquad (3)$$

$$= H_{threshold} + P_{transfer}T_{transfer} \qquad (4)$$

linearly increasing during the course of the traversal time subsequent to the initial pulse as depicted in FIG. 2. Linear proportionality of removed or transferred dye to deposited exposure when operating near the adiabatic limit causes the image density to be linearly proportional to the duration $T_{transfer}$ of the laser power beyond the initial pulse attaining threshold:

$$D_{donor} = -T_{transfer} \frac{D_{donor,max} - D_{donor,min}}{T_{traverse} - T_{initial}} + D_{donor,max} \qquad (5)$$

Figure 3:
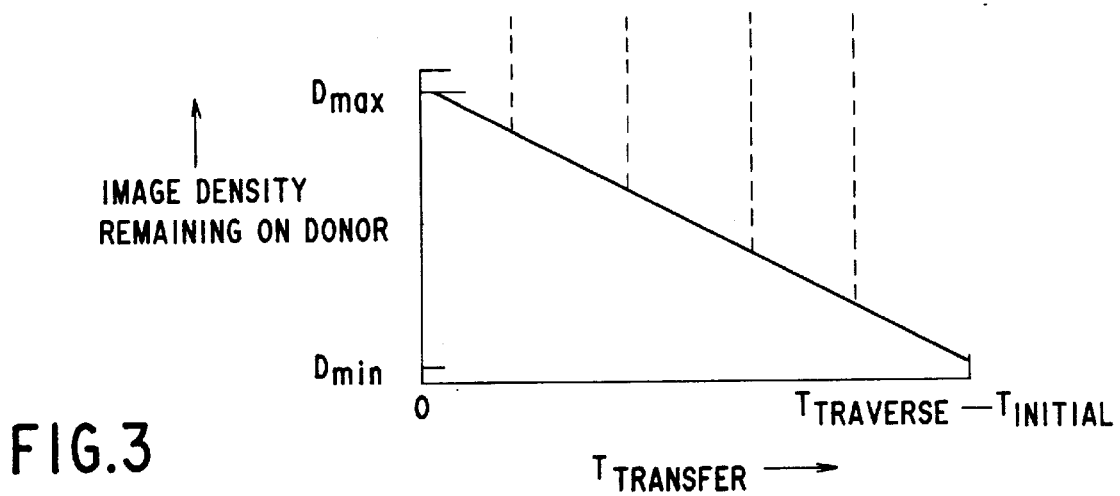
FIG. 3 is a graph showing remaining density of the donor versus transfer time beyond the initial pulse attaining transfer threshold according to the present invention.

Each constant increment of time indicated by spacing between vertical dotted lines removes or transfers a constant increment of dye depicted in FIG. 3. Producing equal density increments is desirable to avoid contouring, i.e., unwanted density steps, in the printed images. If the observability of contouring depends only on the fractional change in light transmitted or reflected from image areas at the density-step boundary with optimal illumination for the local image density, then a printer writing equal density increments will be able to avoid producing contouring in its written images while utilizing the least number of discriminable density levels. Operation with the least number of levels permits use of smaller digital memories, less expensive digital-to-analog conversion circuits, and simplified control of laser power.

Figure 4:
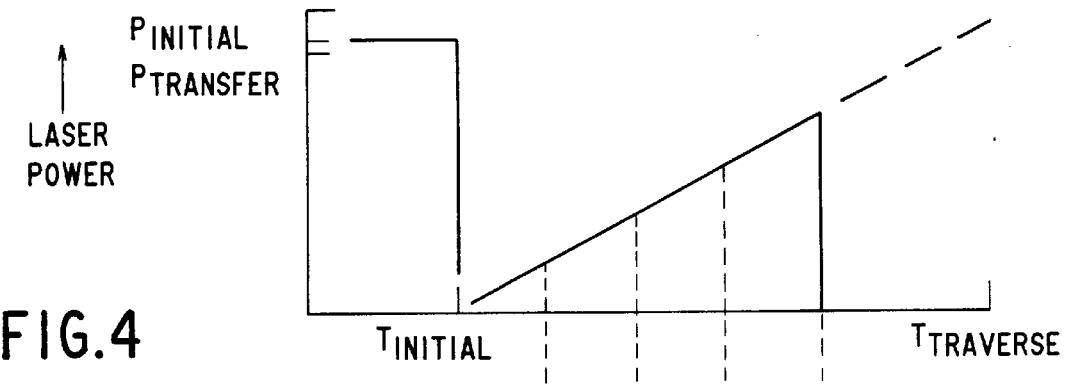
FIG. 4 is a graph showing laser power versus beam-on time according to a second embodiment of the present invention.
Figure 5:
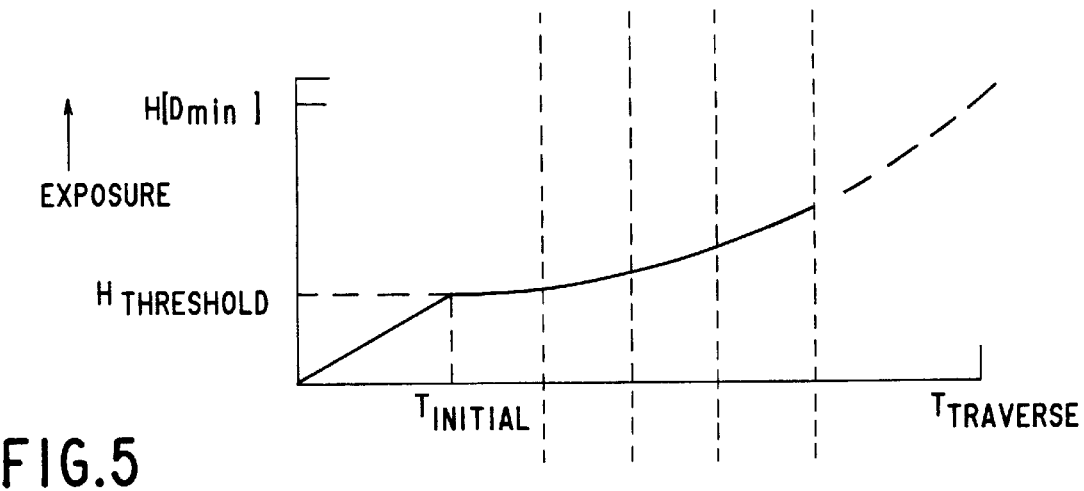
FIG. 5 is a graph showing laser exposure versus beam-on time according to the second embodiment of the present invention.
Figure 6:
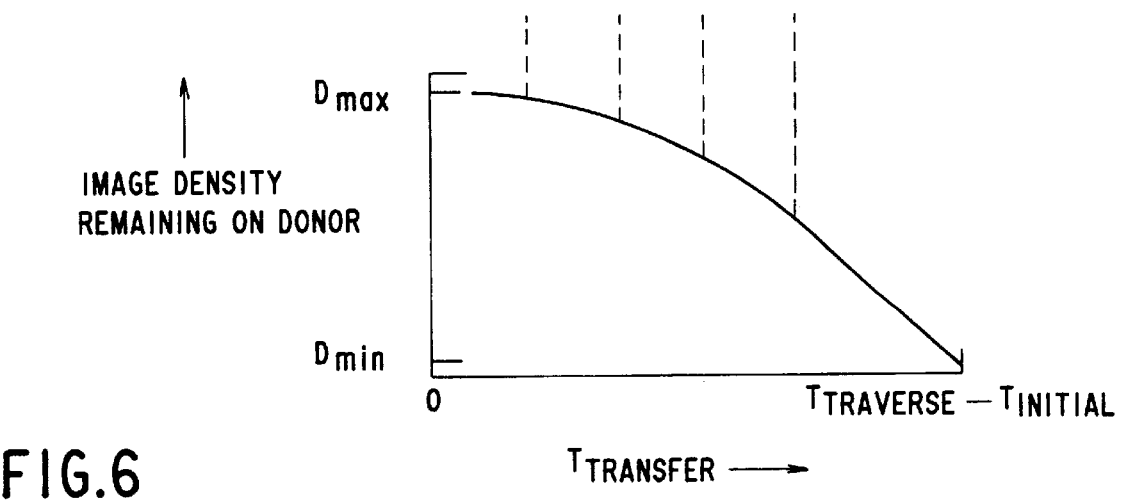
FIG. 6 is a graph showing remaining density on the donor versus transfer time beyond the initial pulse attaining transfer threshold according to the second embodiment of the present invention.

A second embodiment illustrated by FIGS. 4–6 uses an initial pulse of $P_{initial}$ for $T_{initial}$ to supply the threshold exposure, then reduces the power to a low value followed by a linear increase of the laser power with the remainder of the time in the traversal period, extinguishing the laser when the requisite exposure has been deposited.

$$P[t] = \begin{bmatrix} P_{initial} & \text{for } 0 \leq t \leq T_{initial} \\ \dfrac{P_{transfer}}{T_{traverse} - T_{initial}} (t - T_{initial}) & \text{for } T_{initial} < t \leq (T_{initial} + T_{transfer}) \end{bmatrix} \qquad (6)$$

provides the exposure:

$$H[x,y] = \begin{bmatrix} P_{initial}t & \text{for } 0 \leq t \leq T_{initial} \\ H_{threshold} + \dfrac{1}{2} \dfrac{P_{transfer}}{T_{traverse} - T_{initial}} \cdot & \text{for } T_{initial} < t \leq (T_{initial} + T_{transfer}) \\ (t - T_{initial})^2 & \end{bmatrix} \qquad (7)$$

$$= H_{threshold} + \frac{1}{2} \frac{P_{transfer}}{T_{traverse} - T_{initial}} (T_{transfer})^2 \qquad (4)$$

Figure 7:
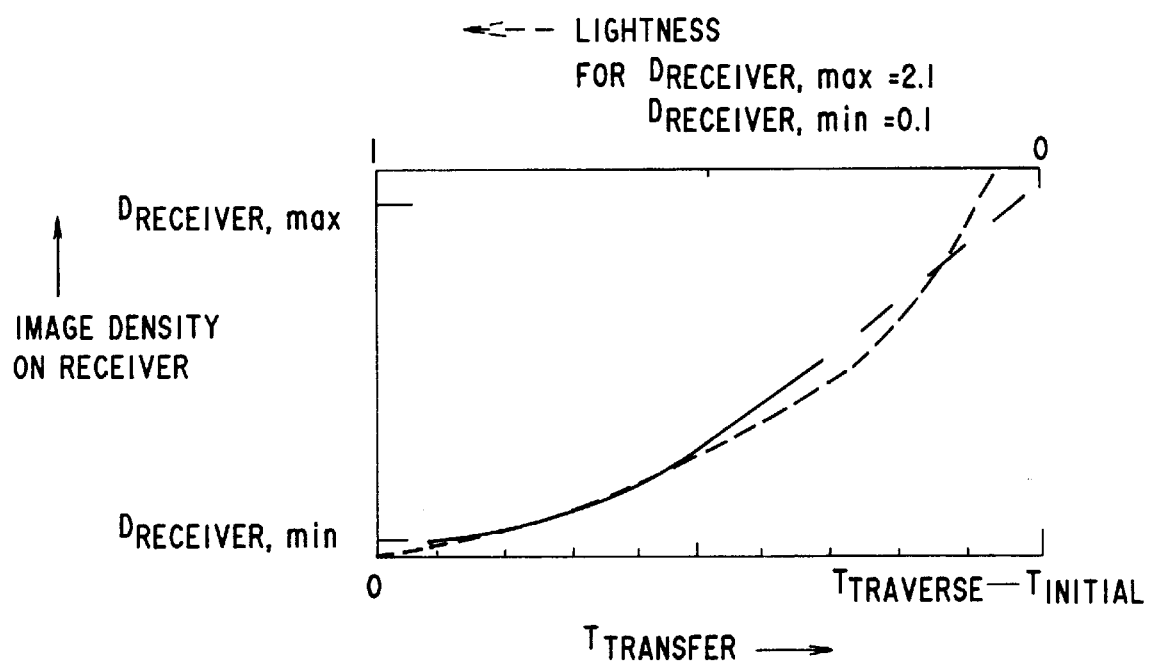
FIG. 7 is a graph showing the image density transferred to a receiver as a function of transfer time and versus the perceptual quantity of image lightness of the receiver according to the second embodiment of the present invention.

Proportionality of the quantity of removed (or transferred) dye to the accumulated exposure implies that the image density on the donor decreases parabolically with the duration of the power ramping:

$$D_{donor} = -(T_{transfer})^2 \frac{D_{donor,max} - D_{donor,min}}{(T_{traverse} - T_{initial})^2} + D_{donor,max} \qquad (9)$$

as depicted in FIG. 6. If the dye removed from the donor is transferred to a receiver, the receiver's density increases parabolically with the duration of the power ramping:

$$D_{receiver} = (T_{transfer})^2 \frac{D_{receiver,max} - D_{receiver,min}}{(T_{traverse} - T_{initial})^2} + D_{receiver,min} \qquad (10)$$

plotted as the solid line in FIG. 7 for $T_{transfer}$ (bottom horizontal axis) versus $D_{receiver}$ (left-hand vertical axis). This tone scale on the receiver approximates the square-root "Lightness" scale relating a document's luminance to its perceived brightness. This square-root-scaled "Lightness" of a location in the image is related to the density at that location according to:

$$D = -2 \text{ Log}_{10}[\text{Lightness}] \qquad (11)$$

and superimposed on FIG. 7 for the specific case of ($D_{receiver}$,max=2.1 D) and ($D_{receiver}$,min=0.1 D) for decreasing lightness (upper horizontal axis) versus $D_{receiver}$ (left-hand vertical axis). This measure of "Lightness" is normalized so that a value of zero indicates no luminance emanating from the document, and a value of one indicates the maximum luminance anticipated from an unprinted document. This perception curve can be attained for images on the receiver by using $T_{transfer}$ times nearly equal to the maximum value of ($T_{traverse}-T_{initial}$) to expose regions intended to exhibit low lightness, and by using $T_{transfer}$ times much shorter than the maximum to expose regions intended to exhibit high lightness.

Figure 8:
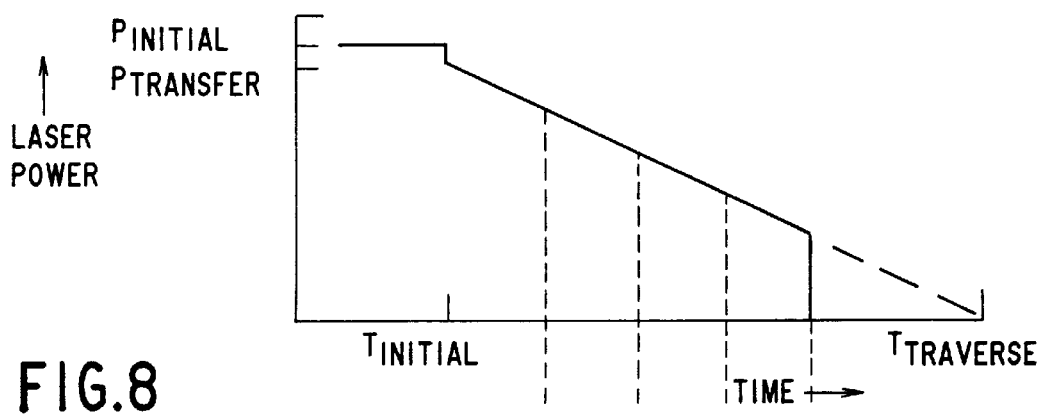
FIG. 8 is a graph showing laser power versus beam-on time according to a third embodiment of the present invention.
Figure 9:
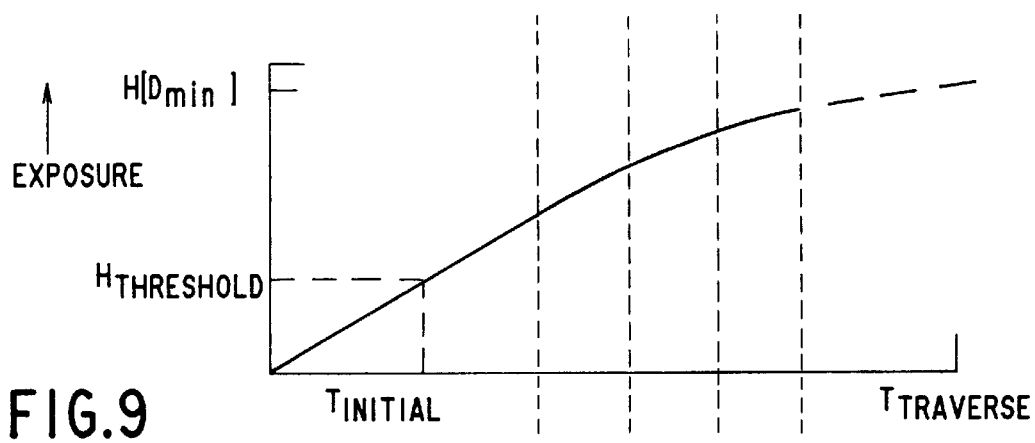
FIG. 9 is a graph showing laser exposure versus beam-on time according to the third embodiment of the present invention.
Figure 10:
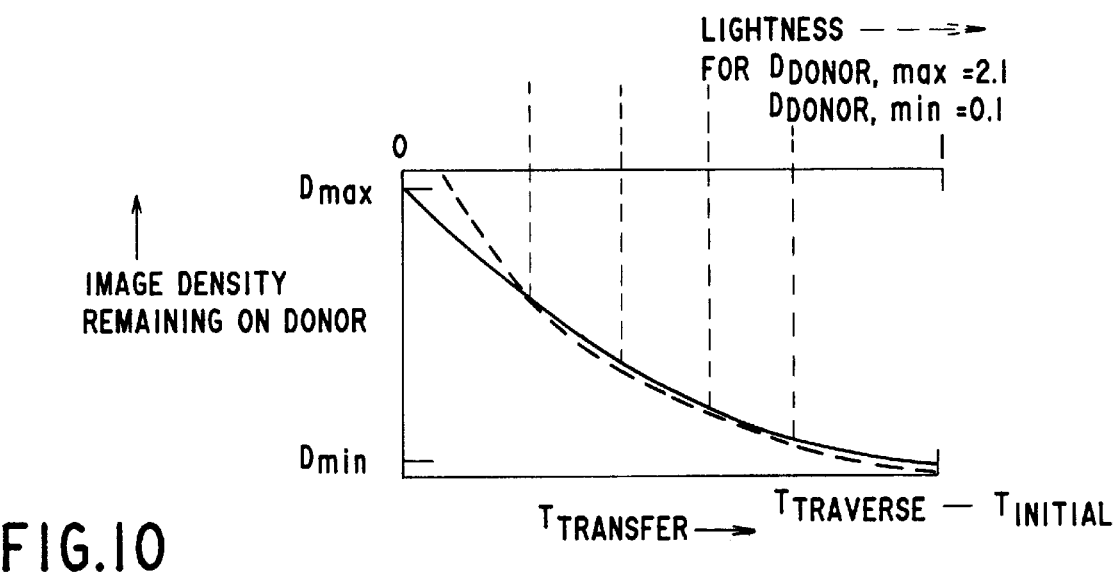
FIG. 10 is a graph showing remaining density on the donor versus transfer time beyond the initial pulse attaining density removal and versus the perceived lightness of the image on the donor according to the third embodiment of the present invention.

A third embodiment appearing in FIGS. 8–10 pulses the laser at $P_{initial}$ for $T_{initial}$ to supply the threshold exposure, then decreases the laser power linearly with the remainder of the time in the traversal period (possibly from a power $P_{transfer}$ which is different from $P_{initial}$), extinguishing the laser when the requisite exposure has been deposited.

$$P[t] = \qquad (12)$$

$$\begin{bmatrix} P_{initial} & \text{for } 0 \leq t \leq T_{initial} \\ \dfrac{P_{transfer}}{T_{traverse} - T_{initial}} (T_{traverse} - t) & \text{for } T_{initial} < t \leq (T_{initial} + T_{transfer}) \end{bmatrix}$$

provides the exposure:

$$H[x, y] = \begin{bmatrix} P_{initial}t & \text{for } 0 \leq t \leq T_{initial} \\ H_{threshold} + \dfrac{1}{2} \dfrac{P_{transfer}}{T_{traverse} - T_{initial}} \cdot & \\ [(T_{traverse} - T_{initial})^2 - T_{traverse} - t)^2] & \text{for } T_{initial} \leq t \leq (T_{initial} + T_{transfer}) \end{bmatrix} \qquad (13)$$

-continued $$= H_{threshold} + \frac{1}{2} P_{transfer}(T_{traverse} - T_{initial}) \cdot \left[1 - \left[1 - \frac{T_{transfer}}{T_{traverse} - T_{initial}}\right]^2\right] \quad (14)$$

Proportionally between exposure and dye removal implies that the image density on the donor decreases at a diminishing rate with the duration of the power down-ramping:

$$D_{donor} = D_{donor,max} - (D_{donor,max} - D_{donor,min}) \cdot \left[1 - \left[1 - \frac{T_{transfer}}{T_{traverse} - T_{initial}}\right]^2\right] \quad (15)$$

(depicted as the solid curve in FIG. 10 and referring to the bottom horizontal axis of $T_{transfer}$ and left-hand vertical axis of density remaining on donor) with approximately the same dependence as the increasing perceptual "Lightness" of the image (plotted as the dotted curve and referring to the upper horizontal axis of increasing lightness and left-hand vertical axis of density remaining on donor). The perceptual "Lightness" values would be obtained in the donor image with straightforward encoding of the Lightness as $T_{transfer}$.

Figure 11:
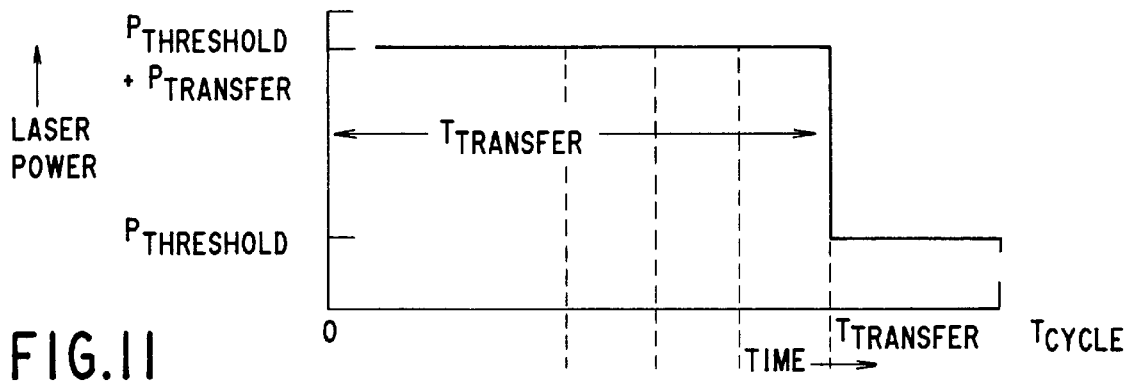
FIG. 11 is a graph showing laser power versus time during a density-removal cycle according to a fourth embodiment of the present invention.

The fourth embodiment depicted in FIGS. 11–13 directs a constant value of laser power slightly below $P_{threshold}$ onto the donor, and increments this power by an amount $P_{transfer}$ for the requisite period $T_{transfer}$ of density-removal cycle time $T_{cycle}$ to deposit the desired exposure.

$$P[t] = \begin{cases} P_{threshold} + P_{transfer} & \text{for } 0 \leq t \leq T_{transfer} \\ P_{threshold} & \text{for } T_{transfer} < t \leq T_{cycle} \end{cases} \quad (16)$$

$P_{threshold}$ is the lowest laser power causing a perceptible amount of dye to be removed or transferred under the scanning conditions. Advantages of this provision of constant power $P_{threshold}$ compared to the pulsed power to attain dye-transfer threshold in previous three embodiments are that:

1. lasers with lower maximum power can be utilized;
2. lasers and current supplies with lower maximum-frequency may be adequate; and
3. the region of donor heating during one density-removal cycle is not confined to the beam area instantaneously projected onto the donor, permitting $T_{cycle}$ to be longer than $T_{traverse}$.

Figure 12:
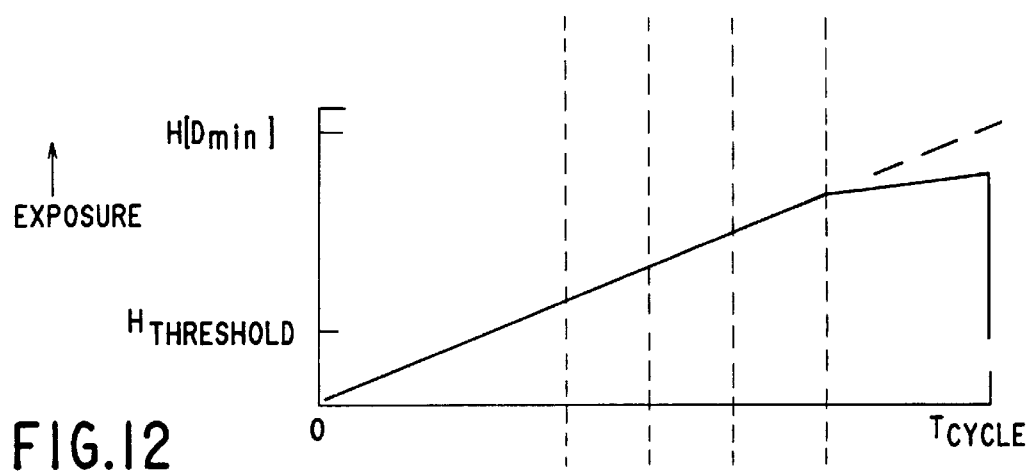
FIG. 12 is a graph showing laser exposure versus time during a density-removal cycle according to the fourth embodiment of the present invention.
Figure 13:
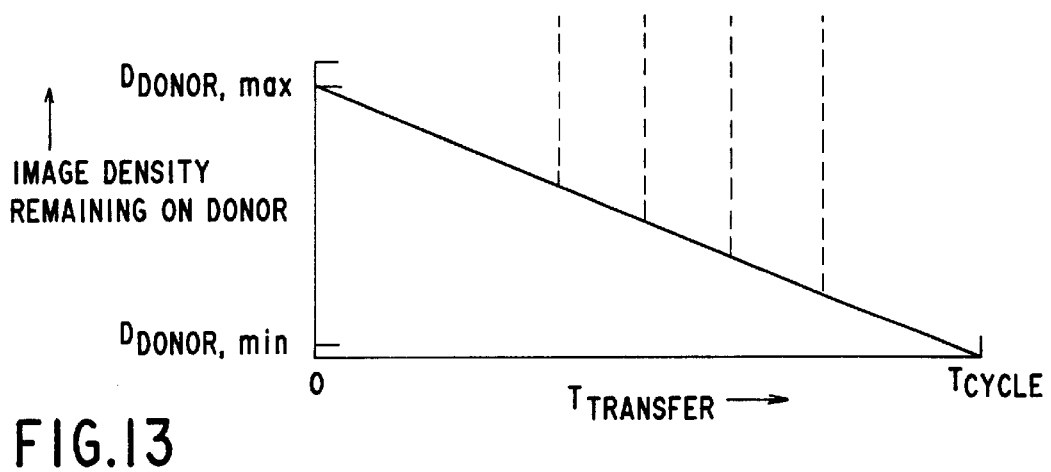
FIG. 13 is a graph showing remaining density on the donor versus transfer time according to the fourth embodiment of the present invention.

If $T_{cycle}$ is less than or equal to $T_{traverse}$, this power sequence deposits exposure at location (x,y) of:

$$H[x, y] = \begin{cases} (P_{threshold} + P_{transfer})t & \text{for } 0 \leq t \leq T_{transfer} \\ P_{threshold}t + P_{transfer}T_{transfer} & \text{for } T_{transfer} \leq t \leq T_{cycle} \end{cases} \quad (17)$$

$$= P_{threshold}T_{cycle} + P_{transfer}T_{transfer} \quad (18)$$

linearly increasing during the cycle time as depicted in FIG. 12. Linear proportionality of removed or transferred dye to deposited exposure when operating near the adiabatic limit reduces the image density in linear proportion with the duration $T_{transfer}$ of the increment in laser power above $P_{threshold}$:

$$D_{donor} = -T_{transfer}\frac{D_{donor,max} - D_{donor,min}}{T_{cycle}} + D_{donor,max} \quad (19)$$

Constant density decrements for equal $T_{transfer}$ increments maintains minimum contouring for images whose illumination can be adjusted to obtain maximum visual sensitivity to luminance variations at any location in the image, such as "hot lighting" of radiographs.

Figure 14:
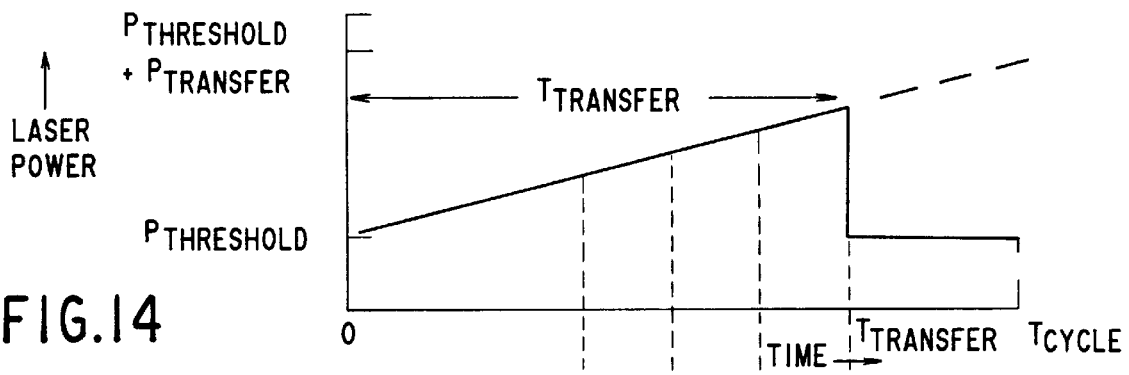
FIG. 14 is a graph showing laser power versus time during a density-removal cycle according to a fifth embodiment of the present invention.
Figure 15:
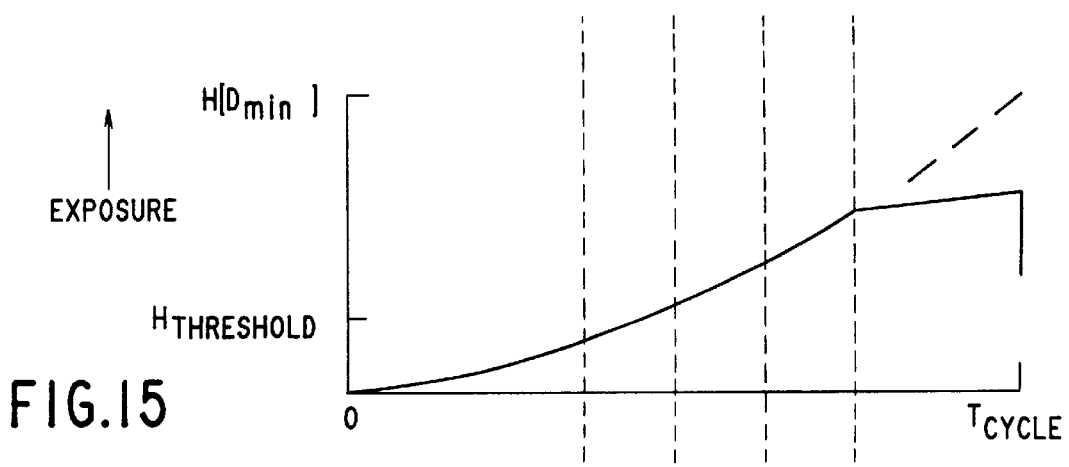
FIG. 15 is a graph showing laser exposure versus time during a density-removal cycle according to the fifth embodiment of the present invention.

The fifth embodiment illustrated by FIGS. 14–16 directs a constant value of laser power slightly below $P_{threshold}$ onto the donor, and superimposes a power linearly increasing to value $P_{transfer}$ for the requisite period $T_{transfer}$ of cycle time $T_{cycle}$ to deposit the desired exposure, then returns to the steady power $P_{threshold}$ for the remainder of the cycle time.

$$P[t] = \begin{cases} P_{threshold} + \frac{P_{transfer}}{T_{cycle}} t & \text{for } 0 \leq t \leq T_{transfer} \\ P_{threshold} & \text{for } T_{transfer} < t \leq T_{cycle} \end{cases} \quad (20)$$

If $T_{cycle}$ is less than or equal to $T_{traverse}$, then this power sequence deposits the exposure:

$$H[x,y] = \begin{cases} P_{threshold}t + \frac{1}{2}\frac{P_{transfer}}{T_{cycle}} t^2 & \text{for } 0 \leq t \leq T_{transfer} \\ P_{threshold}t + \frac{1}{2}\frac{P_{transfer}}{T_{cycle}} T_{transfer}^2 & \text{for } T_{transfer} \leq t \leq T_{cycle} \end{cases} \quad (21)$$

$$= P_{threshold}T_{cycle} + \frac{1}{2}\frac{P_{transfer}}{T_{cycle}}(T_{transfer})^2 \quad (22)$$

Figure 16:
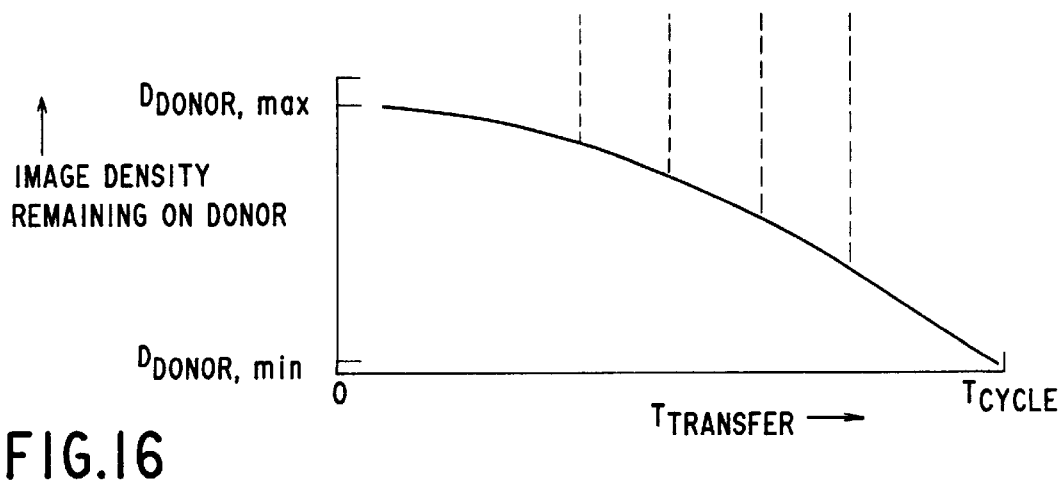
FIG. 16 is a graph showing remaining density on the donor versus transfer time according to the fifth embodiment of the present invention.

The image density on the donor decreases parabolically with the duration of the power ramping if the printing process is performing near the adiabatic limit so that the dye removal (or transferal) is proportional to the accumulated exposure:

$$D_{donor} = -(T_{transfer})^2\frac{D_{donor,max} - D_{donor,min}}{(T_{cycle})^2} + D_{donor,max} \quad (23)$$

as depicted in FIG. 16. Since this density tone scale is identical to that depicted in FIG. 6 and stated in Eq. (9) for the second embodiment with the replacement of "$T_{cycle}$" for "$T_{traverse}-T_{initial}$", a receiver poised adjacent this donor during exposure would exhibit the same tone scale approximating "Lightness" as the receiver in the second embodiment plotted in FIG. 7 and stated in Eq. (10) with the corresponding replacements:

$$D_{receiver} = -(T_{transfer})^2\frac{D_{receiver,max} - D_{receiver,min}}{(T_{cycle})^2} + D_{receiver,min} \quad (24)$$

Figure 17:
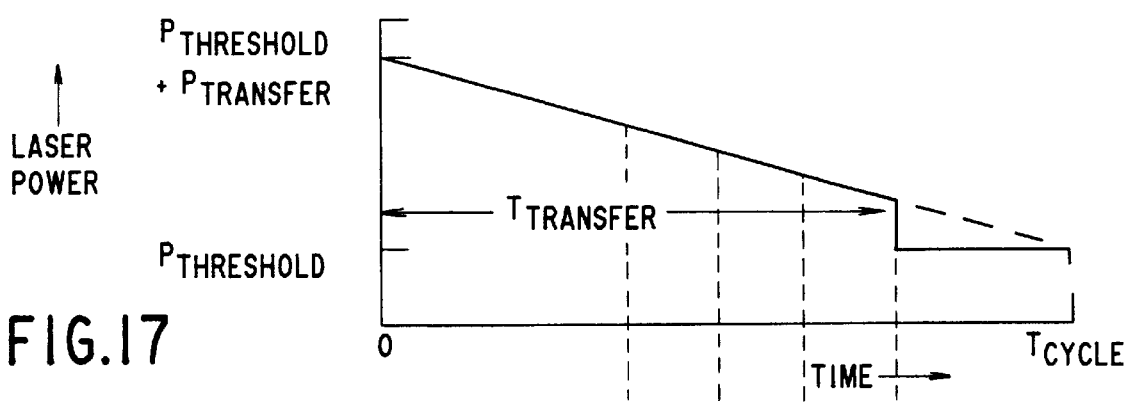
FIG. 17 is a graph showing laser power versus time during a density-removal cycle according to a sixth embodiment of the present invention.
Figure 18:
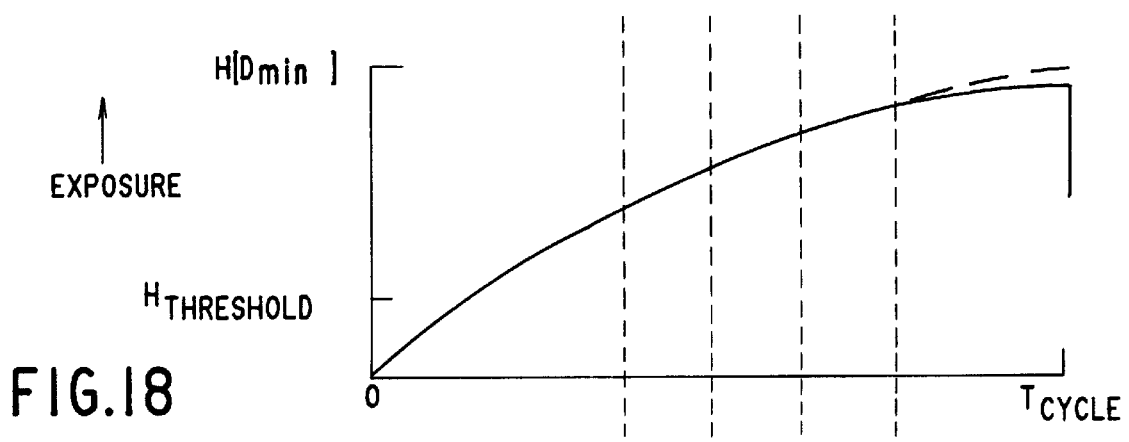
FIG. 18 is a graph showing laser exposure versus time during a density-removal cycle according to the sixth embodiment of the present invention.
Figure 19:
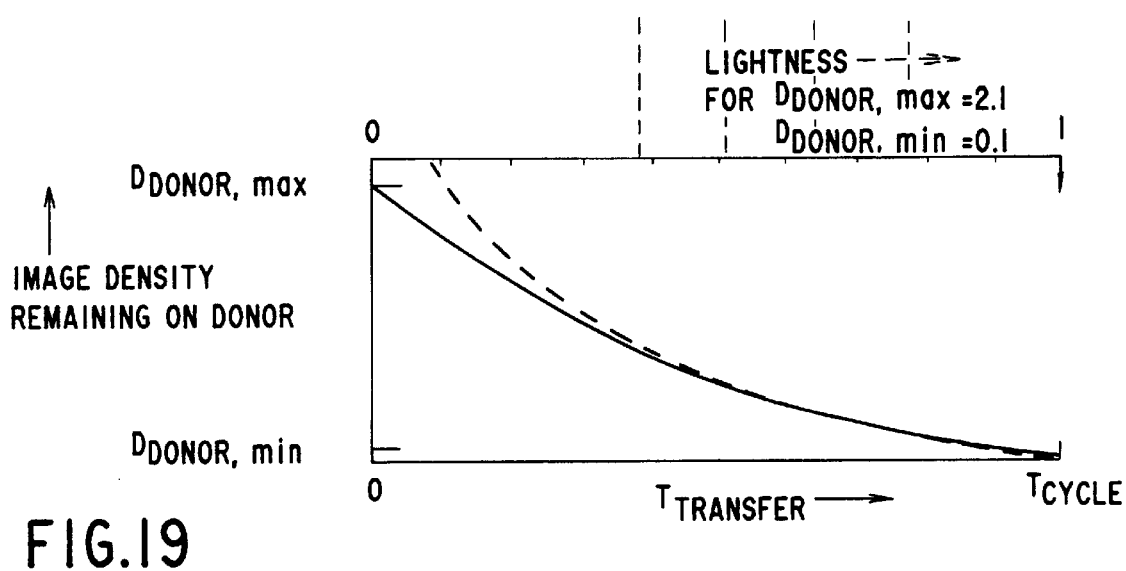
FIG. 19 is a graph showing remaining density on the donor versus transfer time and versus perceived image lightness on the donor according to the sixth embodiment of the present invention.

The sixth embodiment schematized in FIGS. 17–19 superimposes a laser power linearly decreasing with time from a maximum of $P_{transfer}$ upon a constant power $P_{threshold}$, terminating the downwardly ramping power at the appropriate time $T_{transfer}$ so that the requisite exposure is accumulated on the donor by the end of $T_{cycle}$.

$$P[t] = \begin{cases} P_{threshold} + P_{transfer} - \frac{P_{transfer}}{T_{cycle}} t & \text{for } 0 \leq t \leq T_{transfer} \\ P_{threshold} & \text{for } T_{transfer} < t \leq T_{cycle} \end{cases} \quad (25)$$

If $T_{cycle}$ is less than or equal to $T_{traverse}$ then the accumulated exposure is:

$$H[x,y] = \begin{cases} (P_{threshold} + P_{transfer})t - \frac{1}{2} \frac{P_{transfer}}{T_{cycle}} t^2 & \text{for } 0 \leq t \leq T_{transfer} \\ P_{threshold}t + P_{transfer}T_{transfer} - \frac{1}{2} \frac{P_{transfer}}{T_{cycle}} T_{transfer}^2 & \text{for } T_{transfer} \leq t \leq T_{cycle} \end{cases} \quad (26)$$

$$= P_{threshold}T_{cycle} + P_{transfer}T_{transfer} - \frac{1}{2} \frac{P_{transfer}}{T_{cycle}} (T_{transfer})^2 \quad (27)$$

The image density on the donor decreases at a diminishing pace with the duration of the power ramping if the printing process is performing near the adiabatic limit so that the dye removal (or transferal) is proportional to the exposure accumulated beyond $H_{threshold}$:

$$D_{donor} = D_{donor,max} - (D_{donor,max} - D_{donor,min}) \cdot \left[ 1 - \left[ 1 - \frac{T_{transfer}}{T_{cycle}} \right]^2 \right] \quad (28)$$

plotted as the solid curve in the bottom panel of FIG. 19, approximating the square-root "Lightness" tone scale plotted as the dotted curve for comparison.

The invention has been described in detail with particular reference to preferred embodiments thereof, but it will understood that variations and modifications can be effected within the spirit and scope of the invention.

What is claimed is:

1. A digital thermal dye transfer printer comprising
   a radiation beam exposure source;
   an imagewise adjustable source of input electrical energy to the radiation beam exposure source; and
   a control for applying a base input electrical energy to the radiation beam exposure source, the base input electrical energy having a value just less than a threshold that is just sufficient to effect an exposure which attains a noticeable image density;
   wherein the imagewise adjustable source of input electrical energy to the radiation beam exposure source is adapted;
   to provide an electrical energy input wave form having an adjustable power amplitude and duration; and
   to change the power amplitude and the duration of the input wave form so as to modulate the radiation beam exposure source using a combined pulse width modulation and amplitude modulation scheme.

2. A digital thermal dye transfer printer comprising:
   an exposure beam source;
   drive and control logic for selectively activating the exposure beam source to selectable power levels for selectable time durations during a total modulating waveform according to image data and for thereafter extinguishing the exposure beam source; and
   means for bringing dye donor to a temperature near a threshold of dye transfer using a segment of the total modulating waveform for a very short duration.

3. A digital thermal dye transfer printer as set forth in claim 2 further including means for writing with a laser power whose temporal profile and duration effects an accumulated exposure of the dye donor, in excess of $H_{threshold}$ for these writing conditions, corresponding to a desired amount of image dye to be removed or transferred to produce a dye pattern.

4. A digital thermal dye transfer printer as set forth in claim 3, wherein the temporal profile of the laser power is specified to take on a series of values during one traversal time as directed-by a power profile Look-Up table.

5. A digital thermal dye transfer printer as set forth in claim 3 further comprising a second look-up table for specifying a sequence of times that the exposure source is activated and extinguished during one traversal time in order to provide more possible exposure levels than would be attainable with only power-profile control or only duration control in order to achieve the requisite exposure to produce the desired image density at each location on the dye donor.

6. A digital thermal dye transfer printer as set forth in claim 5 wherein the laser power profile is specified to be a simple function of time, and the duration control involves only one activation and one extinction during each traversal time to permit inexpensive implementation using digital or analog electrical circuits and to minimize required high-frequency response of the exposure beam source.

7. Dye transfer apparatus for applying energy from an energy source applied as a writing spot to a dye layer coating on thermally sensitive image recording material to thereby transfer dye for generating image density directly proportional to the deposited exposure in excess of a threshold value for dye transfer within a volume of dye layer coating with a lateral area equal to that of the writing spot, said apparatus comprising:
   means for scanning the writing spot of energy across the location such that the writing spot traverses its own lateral extent on the recording material; and
   means for modulating amplitude and temporal duration of the energy applied to the writing spot during a time period equal to or shorter than an amount of time required for the writing spot to traverse its own lateral extent on the recording material, said modulating means controlling (i) a pulse which contains an amount of energy just less than the threshold value, and (ii) a period of energy deposition whose amplitude changes as a function of the intended local image density.

8. A method for applying energy from an energy source applied as a writing spot to a dye layer coating on thermally sensitive image recording material to thereby transfer dye for generating image density directly proportional to the deposited exposure in excess of a threshold value for dye transfer within a volume of dye layer coating with a lateral area equal to that of the writing spot, said method comprising the steps of:
   scanning the writing spot of energy across the location such that the writing spot traverses its own lateral extent on the recording material; and
   modulating amplitude and temporal duration of the energy applied to the writing spot during a time period equal to or shorter than an amount of time required for the writing spot to traverse its own lateral extent on the recording material, said modulating step including (i) controlling a pulse which contains an amount of energy just less than the threshold value, and (ii) controlling a period of energy deposition whose amplitude changes as a function of the intended local image density.

* * * * *